(No Model.)  T. H. & E. GARDNER.  5 Sheets—Sheet 1.
CHAIR.

No. 479,415.  Patented July 26, 1892.

Witnesses,  Inventors, (No Model.) 5 Sheets—Sheet 2.

T. H. & E. GARDNER.
CHAIR.

No. 479,415. Patented July 26, 1892.

ON LINE x—x

Witnesses
L. W. Brooke
Baltus DeLong

Inventors
Thomas Harry Gardner
Edward Gardner
By their Attys
Baldwin, Davidson & Wight (No Model.) 5 Sheets—Sheet 3.
T. H. & E. GARDNER.
CHAIR.
No. 479,415. Patented July 26, 1892.

Witnesses
Inventors
Thomas Harry Gardner,
Edward Gardner,
By their attys.

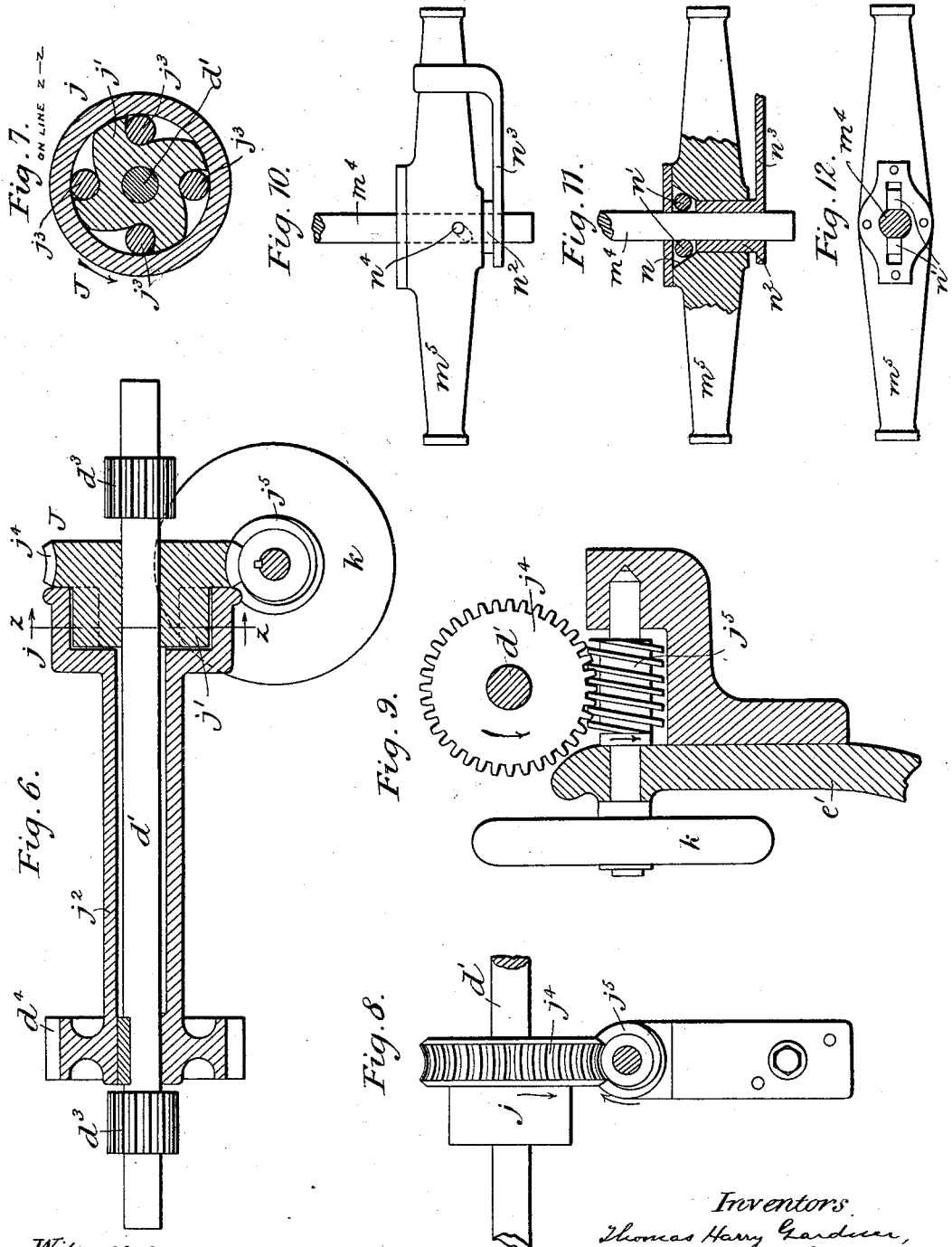

(No Model.)

T. H. & E. GARDNER.
CHAIR.

No. 479,415. Patented July 26, 1892.

ON LINE u-u

ON LINE v-v

ON LINE w-w

Witnesses
Sidney P. Hollingsworth
Chas. F. Sinener.

Inventors.
Thomas H. Gardner
Edward Gardner
by their attorneys
Baldwin Davidson & Wight

THE NORRIS PETERS CO., PHOTO-LITHO., WASHINGTON, D. C.

UNITED STATES PATENT OFFICE.

THOMAS HARRY GARDNER AND EDWARD GARDNER, OF CORNBROOK, MANCHESTER, ENGLAND.

CHAIR.

SPECIFICATION forming part of Letters Patent No. 479,415, dated July 26, 1892.

Application filed July 9, 1891. Serial No. 398,891. (No model.)

*To all whom it may concern:*

Be it known that we, THOMAS HARRY GARDNER and EDWARD GARDNER, subjects of the Queen of Great Britain, residing at Cornbrook, Manchester, England, jointly have invented certain new and useful Improvements in Chairs, of which the following is a specification.

Our invention relates to that well-known class of chairs, more especially adapted to the use of barbers, dentists, or physicians, in which the height and inclination of the seat, back, and head-rest can be varied at will by means of suitable racks, gears, and friction clutches or clamps.

The objects of our invention are to secure a simple and effective apparatus adapted to give the seat, back, and head-rest a wide range of adjustment, to enable them readily to be lifted, to hold them automatically locked in that lifted position, and to allow them to retract or descend by their own weight when the clutching devices are released. These ends we attain by certain novel constructions, combinations, and organizations of instrumentalities hereinafter specified.

Some of our improvements may be used without the others and in chairs differing somewhat in their details of construction from those herein shown.

Unless otherwise indicated, the parts are of usual approved construction.

The accompanying drawings show our improvements as embodied in a chair substantially similar in some respects to one for which United States Letters Patent No. 406,349 were granted to Hepburn and Gardner July 2, 1889. We do not of course claim herein anything shown in that patent.

Figure 1:
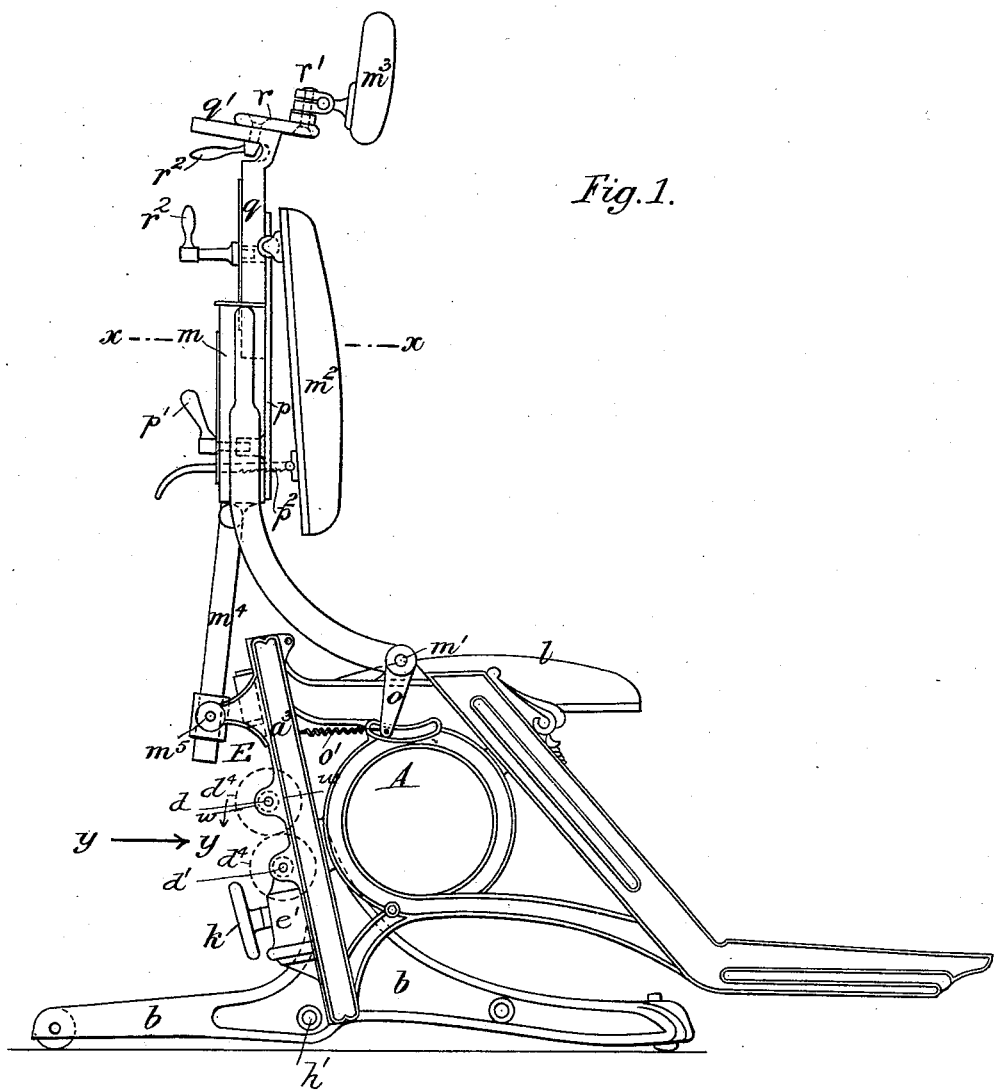
Figure 2:
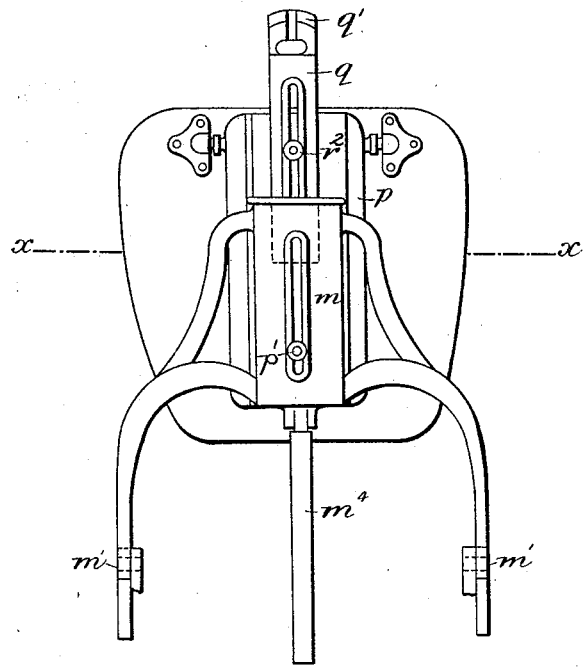
Figure 3:
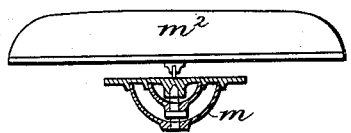
Figure 4:
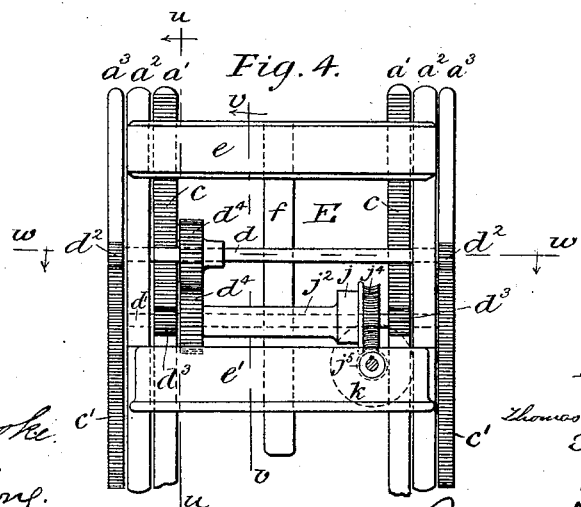
Figure 5:
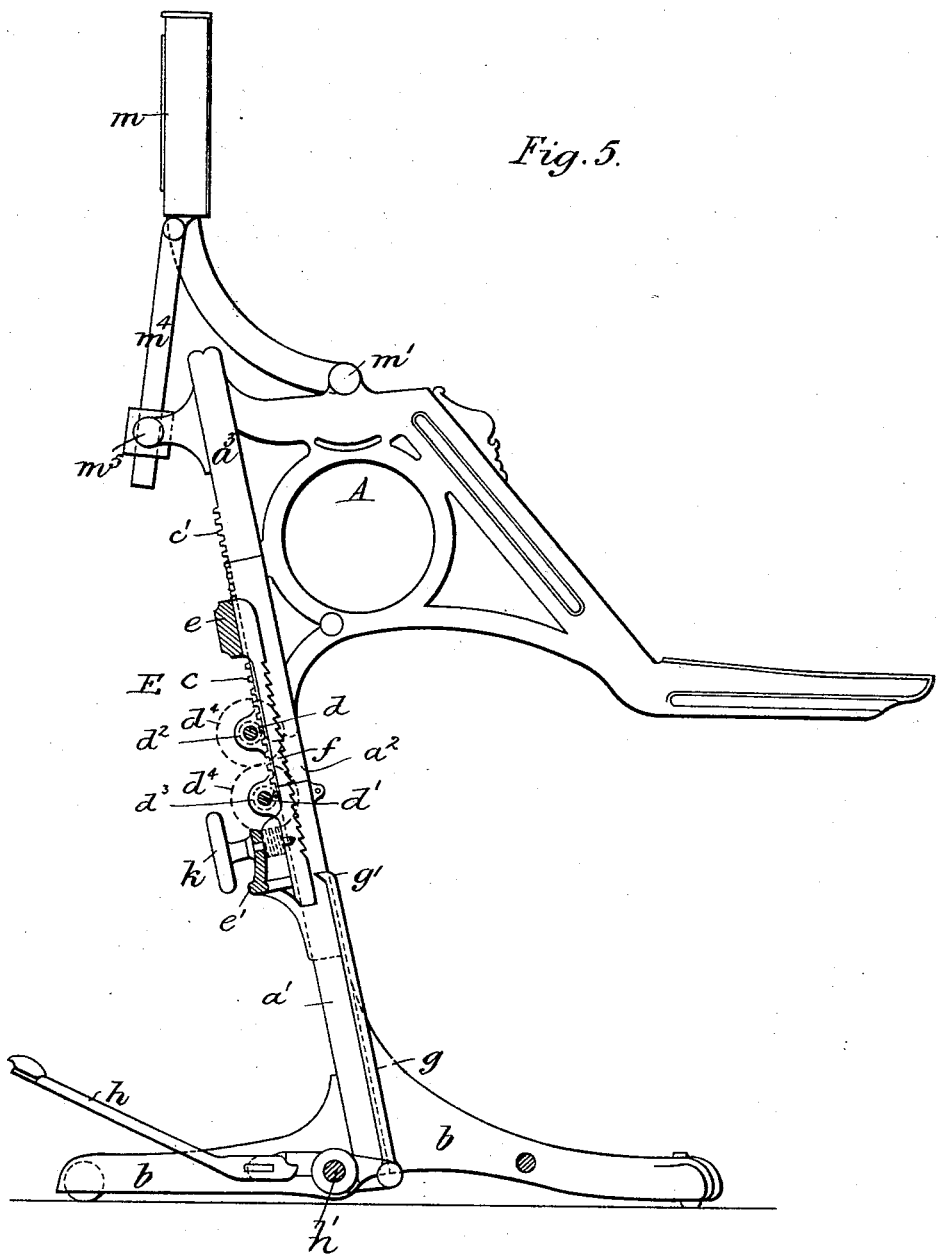
Figure 13:
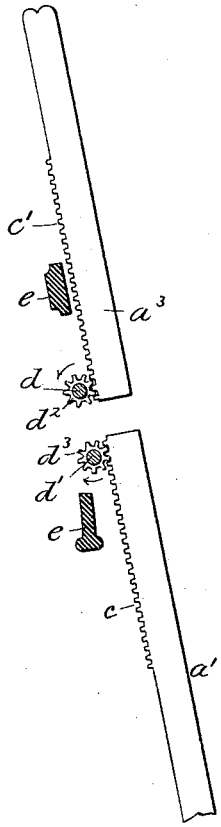
Figure 14:
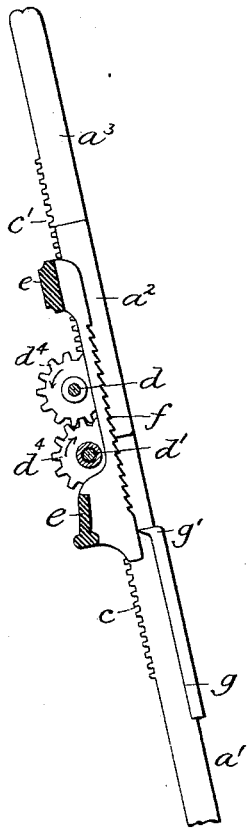
Figure 15:
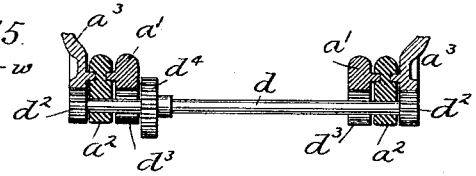

Figure 1 is a side elevation of a chair constructed according to our invention with the seat-frame in its lowest position; Fig. 2, a rear elevation of the chair-back and appurtenant parts detached; Fig. 3, a horizontal section through the chair-back on the line $xx$ of Figs. 1 and 2, looking downward; Fig. 4, a rear view of the lower part of the chair, looking in the direction of the arrow $y\ y$, Fig. 1, with the parts in the position shown in that figure; Fig. 5, a side elevation, partly in section, of the chair with the seat-frame in its highest position; Fig. 6, a vertical longitudinal section through part of the seat-frame locking-gear and its retaining-clutch, looking forward; Fig. 7, a vertical cross-section through this clutch on the line $z\ z$ of Fig. 6, looking outward or to the right, as indicated by the dart, Fig. 6, and showing the clutch released; Fig. 8, a rear elevation of this clutch and the worm-gearing which controls it, omitting its casing and actuating-wheel; Fig. 9, an end elevation, partly in section, of the same parts, including this wheel, looking inward or to the left. Fig. 10 is a rear elevation of the back-adjusting clutch detached; Fig. 11, a vertical longitudinal section through the central portion thereof, and Fig. 12 a plan thereof. Fig. 13 is a diagram view or skeleton section on the line $u\ u$ of Fig. 4, looking to the left, showing the locking-racks with the parts in the position shown in Fig. 5; Fig. 14, a similar view of the locking-gear on the line $v\ v$ of Fig. 4; and Fig. 15, a horizontal section of the locking mechanism on the line $w\ w$ of Figs. 1 and 4, looking downward. Figs. 6 to 12, inclusive, are on an enlarged scale.

That side on the right of a person facing the chair-back we term the "right," the opposite the "left," side.

Arrows indicate the direction in which the views are taken.

The drawings show a base or foot $b$, carrying standards supporting a seat-frame A. These standards each consist of three parts or sections sliding telescopically upon each other to raise and lower the seat-frame. These three sections of each standard lie side by side. The inner or lower sections $a'$ are rigidly secured upon the base, foot, or legs of the chair. The intermediate or middle sections $a^2$ are longitudinally grooved on each side, one groove sliding on a flange or rib on the corresponding inner, fixed, or lower section $a'$, and the other on a corresponding rib or flange on the outer or upper sections $a^3$. (See Figs. 4 and 15.) The fixed sections $a'$ and upper sections $a^3$ are respectively provided with racks $c\ c'$. Parallel transverse shafts $d\ d'$, turning in bearings in the intermediate sections $a^2$, respectively carry at or near each end pinions $d^2\ d^3$, gearing with their corresponding racks $c\ c'$. The pinions $d^2$ of the upper shaft $d$ are shown as gearing with the racks $c'$ of the outer standard-sections $a^3$, while the pinions $d^3$ of the lower shaft $d'$ gear with the racks $c$ of the inner sections $a'$. The shafts $d$ $d'$ carry similar intermeshing gears $d^4$ $d^4$, which cause them to revolve at equal speeds. The two intermediate standard-sections are connected by cross-bars $e$ $e'$ to give greater rigidity, to which cross-bars an upright central lifting-rack $f$ is fixed. (See Figs. 4 and 14.) These cross-bars and intermediate standard-sections constitute what we call a "gear-frame" E. A pawl $g'$ on a rod $g$ vibratable vertically by a treadle $h$, rocking on a fulcrum or pivot $h'$, engages with this lifting-rack, so that whenever the pawl moves upward it lifts the intermediate standard-sections $a^2$. This movement causes the pinions $d^3$, lower shaft $d'$, and its gear $d^4$ to turn by traversing the pinions $d^3$ over the racks $c$ of the fixed standard-section $a'$. This movement simultaneously rotates the gear $d^4$ and pinions $d^2$ on the upper shaft $d$. This causes the racks $c'$ of the upper standard-sections $a^3$ to traverse the pinion $d^2$ and lift the upper standard-sections $a^3$ above the uplifted intermediate sections $a^2$, which latter are lifted above the fixed ones, as above described. (See Figs. 5, 13, and 14.)

The lower or actuating shaft $d'$ is shown as provided with a self-acting locking or retaining clutch J, consisting of a cylindrical casing or hub $j$, inclosing a spider or rack $j'$, turning freely on this shaft. This hub or casing is fixed on one end of a sleeve or tube $j^2$, fitting loosely on the actuating-shaft $d'$ and has its opposite end fixed to said shaft or to the gear $d^4$ thereon, thus compelling the actuating-shaft and clutch-casing always to turn together or maintain the same fixed relation.

The rack $j^2$, which we term a "circular" or "rotary" rack, is shown as consisting of four arms, constituting a spider turning freely on the actuating-shaft $d'$, the outer ends of these arms being concentric with the shaft and curved conformably with the interior of the clutch casing or hub $j$, so as to permit them freely to turn therein. Cavities or recesses substantially wedge-shaped are formed between each two adjacent arms. The sides of these cavities, however, are curved instead of straight, the clutch-casing itself constituting one of such sides. The narrow ends of these cavities point forward. Bowls, cylinders, or rollers $j^3$ traverse these cavities in such manner as to occupy their larger ends when it is desired that the actuating-shaft and clutch-casing shall turn freely, but to lock them when desired by jamming the clutch-casing and rotary rack together, so as to cause them to turn together in a way well understood.

A worm-wheel $j^4$, fixed on the rotary rack $j'$, gears with a worm $j^5$, turning in bearings in the gear-frame, or the bar $e'$, connecting the intermediate standard-sections $a^2$, in which standards the actuating-shaft $d'$ also has its bearings, as hereinbefore explained. This shaft, the clutch, and worm-gear consequently all move together and constantly maintain the same relative position. The worm can be turned in either direction by a wheel $k$. The relative pitches of the worm and worm-wheel are such that the worm is only just prevented from being driven by the worm-wheel, and consequently but slight force is necessary to turn it.

Under the organization above described it will be observed that the seat-frame is lifted by the vertically-reciprocating pawl $g'$, acting on the upright rack $f$ on the gear-frame, thus actuating the gearing mounted in said frame and turning the upper portion of the actuating-shaft $d'$ and clutch-casing $j$ toward the front, as shown by the darts in Figs. 6 and 7. During this movement the locking-rollers $j^3$ occupy the larger end of the cavities in the rotary rack, (see Fig. 7,) thus leaving the actuating-shaft and clutch-casing free to turn in the same direction, while the rotary rack is held in a fixed position by the worm-gear. As soon, however, as the seat-frame begins to descend, the direction of rotation of the actuating-shaft and clutch-casing is reversed and the locking-rollers are caused to pass toward the smaller end of their cavities and jam the casing and rotary rack together, and thus stop the rotation of the actuating-shaft and the accompanying descent of the seat-frame. In order to lower the seat-frame, it is therefore necessary to release the clutch, which is done by turning the actuating-wheel $k$ to the left as shown by the arrows in Figs. 8 and 9. This rotates the worm-wheel $j^4$ and rotary rack $j'$ in the direction shown by the arrows in Figs. 7 and 9, which movement allows the actuating-shaft and clutch-casing to revolve in the same direction and allows the seat-frame to descend. This movement continues so long as the rack continues its rotation, and thereby prevents the locking of the clutch.

A very slight impulse given to the actuating-wheel $k$ suffices to drive the wheel for some time, and if the impulse be sufficient this movement continues during the entire descent of the seat-frame; or, by giving the proper impulse, which is soon learned by practice, the seat-frame will descend the desired distance and then stop, this stoppage occurring immediately on the cessation of the revolution of the actuating-wheel and of the rotary rack, as above explained. This automatic and regular descent of the seat-frame we have found very useful in practice.

The seat-frame is fixed on the upper standard-sections $a^3$. Consequently all the parts rise and fall together.

Each side bar of the seat-frame proper is provided with an upwardly-projecting lug or boss, with which the arms or brackets which support the chair-back are connected by pivots $m'$, $m'$, arranged nearer the front than the back of the seat-frame proper or side bar, say about one-third nearer the front. (See Figs. 1 and 5.) The object of this organization is to have the joints or pivots $m'$, on which the chair-back turns, coincide as nearly as possible with the hip-joint of the occupant, so that when the back-cushion $m^2$ and head-cushion $m^3$, carried by the back, have once been adjusted to suit the occupant the angle of inclination of the back may be varied without necessitating a readjustment of the back and head rests.

A rod $m^4$, pivoted to the chair-back $m$, passes downward through a clutch upon a rocking bar $m^5$, journaled in brackets on the upper standard-sections $a^3$, which also carry the seat-frame. This clutch is shown in Figs. 10, 11, and 12 as consisting of a cone-shaped cup $n$, containing balls, bowls, or cylinders $n'$, surrounding the rod $m^4$, so that when it is pushed downward they are pressed into contact with it and with the cup, and thus jam the rod, preventing its farther descent; but the rod is always free to move upward through the clutch. The rod can be freed, when desired, by lifting the balls by means of a tube $n^2$, adapted to turn and to rise and fall inside the cone or cup by means of an inclined slot in the tube working on a pin $n^4$, Fig. 10, on the rod. The balls rest on the tube, which can be turned, when desired, by a handle $n^3$.

An arm or lever $o$, Fig. 1, on the chair-back $m$ or one of its journals $m'$ is connected by a spring $o'$ with one of the upper standard-sections $a^3$ or the seat-frame. This spring tends to counterbalance the occupant's weight, so that the operator can easily adjust the inclination of the chair-back.

A plate $p$ is adapted to slide freely vertically in guides in the chair-back and to be secured in any desired position therein by a clamping-handle $p'$. A back-cushion $m^2$ is pivoted near its upper end to this back plate and has a rack $p^2$ pivoted near its lower end and passing through the back plate, so as to adjust and hold the cushion at various angles, as desired.

A support $q$, adjustable vertically in the chair-back, Figs. 1 and 2, carries a horizontal or slightly-inclined guide $q'$ for a slide $r$, to which an adjustable supporting-clamp $r'$ for the head-rest $m^3$ is pivoted, so that the latter can not only be set forward or back, but can also be raised or lowered and turned to any desired inclination and secured by usual locking devices $r^2 r^2$. These head-rest-supporting devices are not claimed herein, being well known in the art.

The chair-back is pivotally connected with the chair-seat frame in approximately the same axial line as that of the hip-joints of the occupant of the chair. When the back is tilted rearwardly, the clutch mechanism is positively manipulated in order to get the correct adjustment; but the back may be thrown forward or righted without any manipulation of the clutch.

The mode of operating the chair will readily be understood from the foregoing description. The lifting-pawl $g'$ when actuated by the treadle acts directly on the rack $f$ of the gear-frame to lift it. The rising of this frame causes the pinions of the lower cross-shaft to roll over the racks of the fixed standard-sections, thus rotating this shaft, but without actuating the rotary locking-clutch and its worm-gearing, which are then unclutched from the shaft. The lower shaft through the intermeshing-gears $d^4$ turns the upper cross-shaft in the opposite direction. This upper shaft has both a rising and a rotating movement thus given to it. Consequently its end pinions lift the upper standard-sections both by direct engagement and by rotation. As the seat-frame is carried by these upper standard-sections it is lifted a much greater distance than that due merely to the lifting-pawl, as will be obvious by inspecting Fig. 5.

The automatic simultaneous descent of the seat-frame and gear-frame upon the release of the rotary locking-clutch has already been described.

The automatic locking-clutch of the chair-back operates with peculiar advantage in connection with the counterbalancing-spring, which prevents the too rapid descent of the chair-back should the clutch accidentally be held unclutched too long.

We understand that counterbalancing a chair-back, broadly, is old, but believe our improved organization to be new and useful.

The pivoting of the chair-back near the front of the seat and mounting the locking-clutch of the back-supporting rod in the rocking bearing turning in brackets projecting behind the chair-supports affords a wide base of support for the chair-back, besides allowing it a wide range of movement both vertically and laterally.

Having thus particularly described the construction, organization, and operation of our improved chair, what we claim therein as new, and as of our own joint invention, is—

1. The combination, substantially as hereinbefore set forth, of a chair base or foot, standard-sections fixed thereon, racks on these standards, another set of standard-sections movable endwise thereon, a seat suitably supported, cross-bars connecting these movable standards and constituting with them a gear-frame, means for lifting this frame, a cross-shaft mounted in this gear-frame, pinions on this shaft gearing with the racks on the fixed standard-sections, a rotary self-acting locking-clutch on the shaft, which clutch permits the gear-frame to rise, but prevents its descent, a worm-wheel on the rotary pawl of the clutch, a worm of slight pitch gearing with the worm-wheel, and an actuating-wheel controlling the worm, these members being organized and operating, as specified, to lift and hold up the gear-frame and allow it to descend when the clutch is released by the rotation of the worm-wheel and continue to descend as long as that wheel rotates, but is automatically locked by the stoppage of its rotation.

2. The combination, substantially as hereinbefore set forth, of a chair base or foot, standard-sections fixed thereon, racks on these sections, another set of standard-sections movable endwise thereon, cross-bars connecting these sections and constituting with them a gear-frame, means for lifting this frame, a lower cross-shaft mounted in this gear-frame, pinions on this shaft gearing with the racks on the fixed standard-sections, an upper cross-shaft also mounted in the gear-frame, pinions thereon, gearing connecting the two cross-shafts, a seat-frame, standard-sections carrying it, movable endwise on or parallel with the gear-frame, means for locking the seat-support and gear-frame together, and racks carried by these standard-sections and gearing with the pinions on the upper cross-shafts, these members being organized and operating, as specified, to cause the gear-frame and seat-frame to move together at all times.

3. The combination, substantially as hereinbefore set forth, of a chair base or foot, standard-sections fixed thereon, racks on these sections, another set of standard-sections movable endwise thereon, cross-bars connecting these sections and constituting with them a gear-frame, means for lifting this frame, a lower cross-shaft mounted in this gear-frame, pinions on this shaft gearing with the racks on the fixed standard-sections, a rotary self-acting locking-clutch on this shaft, which clutch permits the frame to rise, but prevents its descent, a worm-wheel on the rotary pawl of the clutch, a worm of slight pitch gearing with the worm-wheel, an actuating-wheel controlling the worm, a seat-frame, standard-sections which carry it movable endwise on or parallel with the other standard-sections, racks carried thereby, an upper cross-shaft carried by the gear-frame, pinions on this shaft working in these racks, and gearing connecting the two cross-shafts, these members being organized and operating, as specified, to cause the gear-frame and seat-frame to move together at all times while free to rise, but automatically locked to prevent their descent until the locking-clutch common to both is released.

4. The combination, substantially as hereinbefore set forth, of a chair base or foot, standard sections or racks fixed thereon, a gear-frame movable endwise thereon, a seat-frame, endwise-moving standard-sections or supporting-racks carrying it, gearing carried by the gear-frame engaging with both the fixed and movable rack-sections, and a rotary locking-clutch, its releasing-gear and actuating-wheel, also carried by the gear-frame, these members being organized and operating, as specified, to allow the seat-frame to rise without obstruction, but automatically preventing its descent until the locking-clutch is released and kept released by the rotation of its actuating-wheel when the seat-frame descends by its own weight.

5. The combination, substantially as hereinbefore set forth, of a chair-seat frame and a chair-back pivotally connected or hinged to the seat-frame above the top of the bottom on which the cushion is supported in approximately the same axial line as that of the hip-joints of occupant of the chair.

6. The combination, substantially as hereinbefore set forth, of a chair-seat frame, a chair-back pivotally connected or hinged to the seat-frame in approximately the same axial line as that of the hip-joints of the occupant of the chair above the top of the bottom on which the cushion is supported, and a counterbalancing-spring connected to the chair-frame and to the back, for the purpose specified.

7. The combination, substantially as hereinbefore set forth, of the chair-seat frame, the back pivotally connected therewith, a downwardly-projecting rod connected to the back and a clutch through which the rod extends, comprising clamping devices normally engaging the rod to prevent its downward movement, but which are constructed and arranged to permit the rod to move upwardly freely, and means for positively actuating the clamping devices to release them from the rod to permit it to descend, the arrangement being such that the back may be swung rearwardly and held in the desired position by positively releasing the clamping devices, but may be moved forward or righted quickly without any manipulation of the clamping devices.

8. The combination, substantially as hereinbefore set forth, of the chair-seat frame, the back pivotally connected therewith, the downwardly-projecting rod hinged to the back, a pivoted clutch through which the rod extends, comprising devices which clamp the rod when it is moved backwardly, but which permit it to be moved upwardly freely, and means for releasing the clamping devices to permit the downward movement of the rod, and a counterbalancing-spring connected with the chair-back and the chair-seat frame, for the purpose specified.

9. The combination, substantially as hereinbefore set forth, of a chair-seat frame, a chair-back, journals or pivot-joints connecting the back and seat-frame, an arm projecting downwardly from the journal of the chair-back, a counterbalancing-spring connecting said arm with the seat-frame, a self-acting locking-clutch on the back of the seat-frame, and an adjusting-rod movable endwise through the clutch and pivoted to the chair-back, these members being organized and operating as and for the purpose specified.

10. The combination, substantially as hereinbefore set forth, of a chair-seat frame, a chair-back, brackets thereon, journals or pivot-joints connecting these brackets and the side bars of the seat-frame above and nearer the front than the rear of said bars, a spring counterbalancing the weight of the chair-back, a self-acting locking-clutch on the back of the seat-frame, an adjusting-rod movable endwise through the clutch, and means, substantially such as described, for throwing the clutch out of operation to permit the descent of the chair-back.

THOMAS HARRY GARDNER.
EDWARD GARDNER.

Witnesses:
EDMUND TYSON,
J. HENRY KIRK.